Patented Oct. 17, 1922.

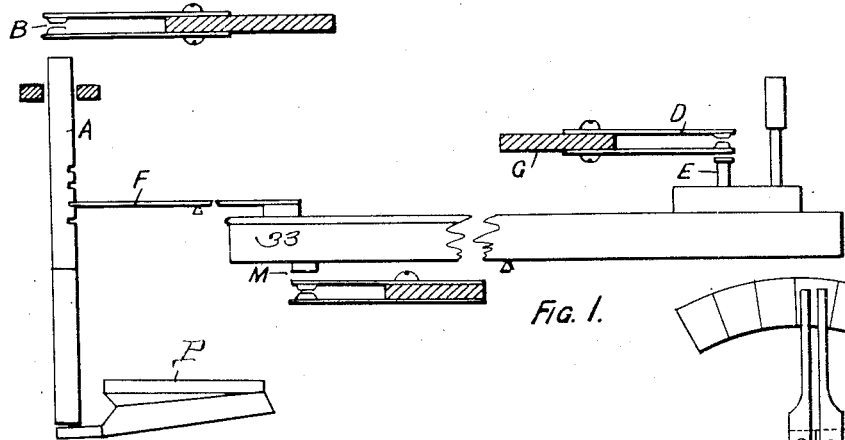
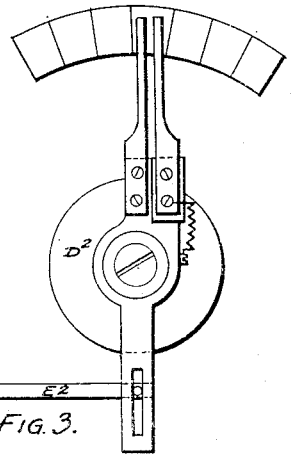
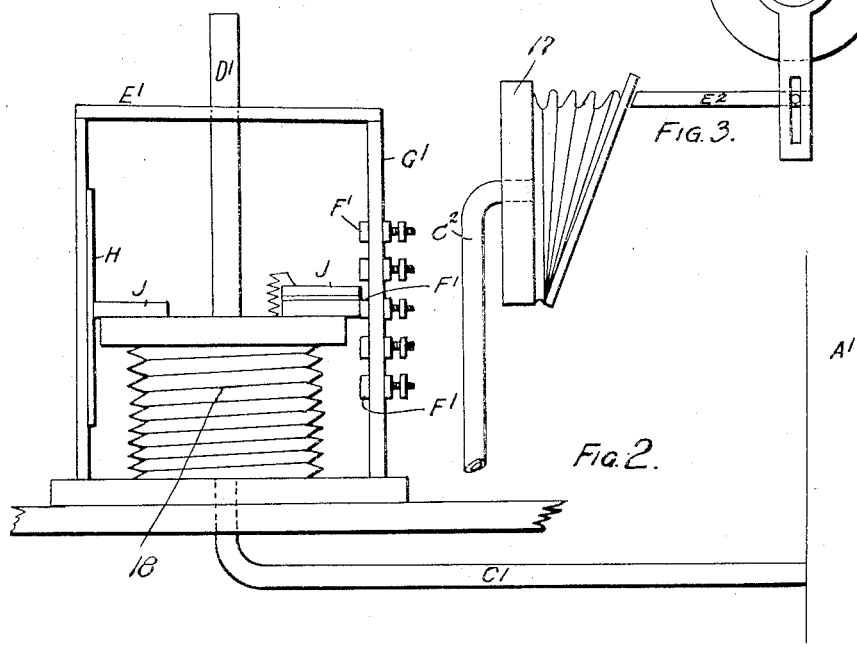

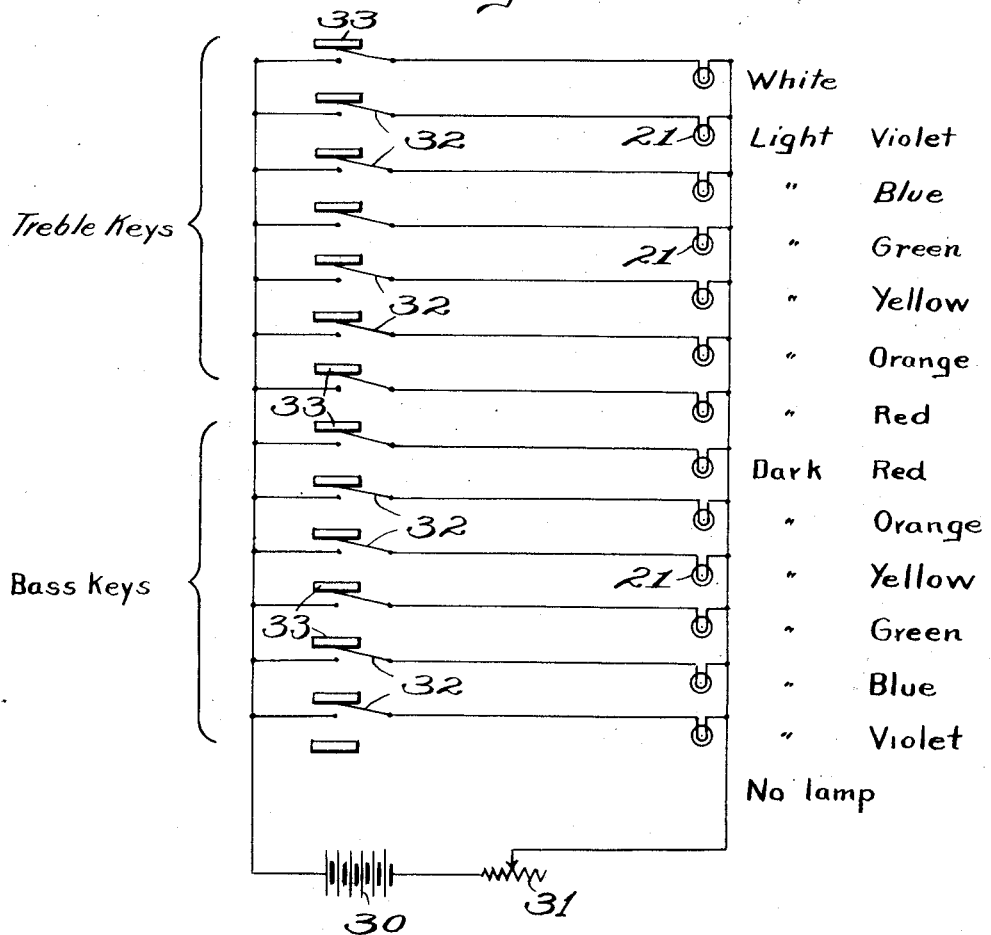
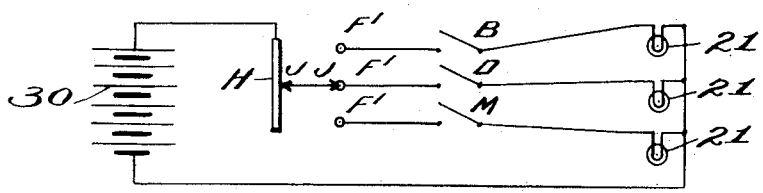

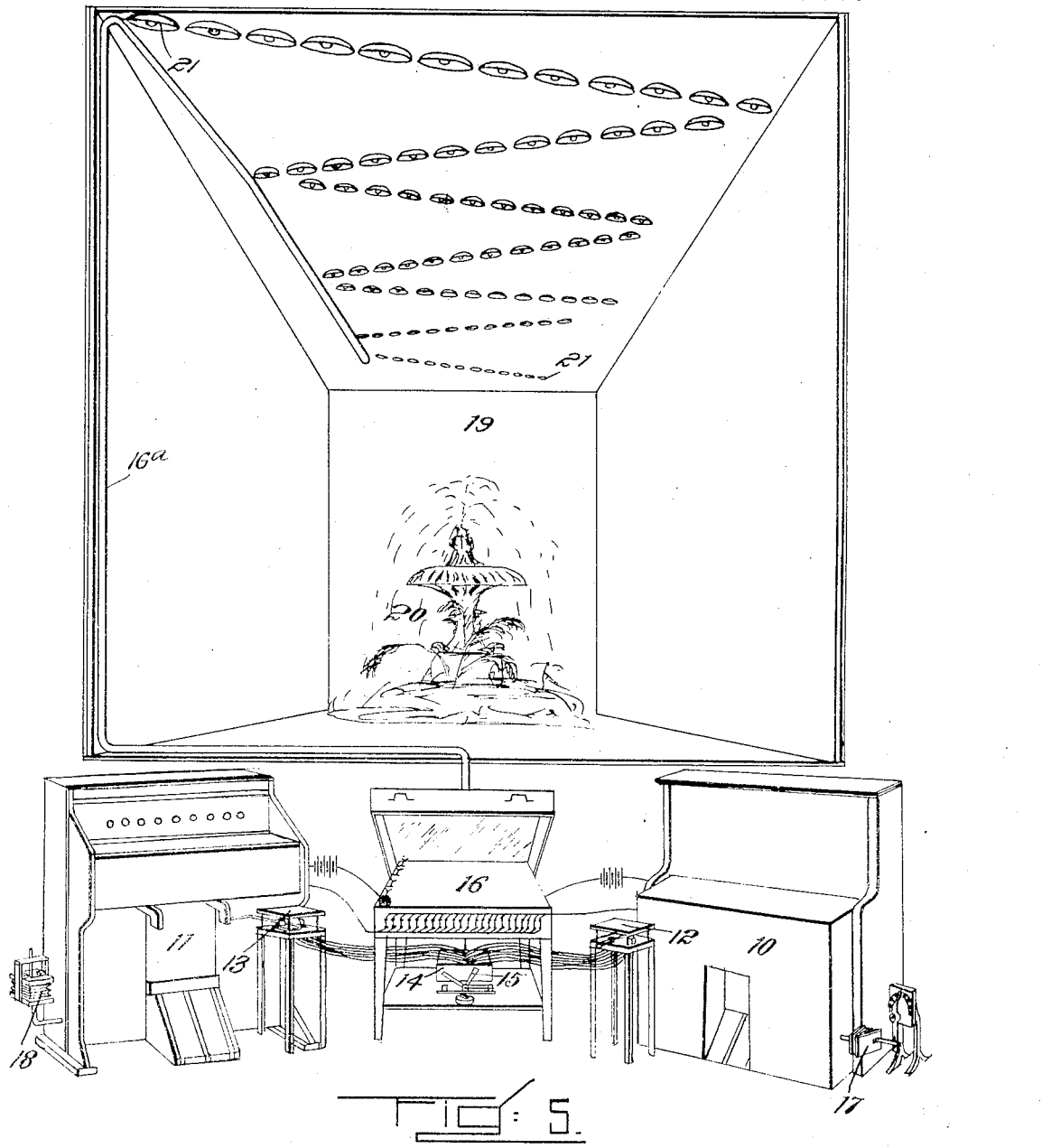

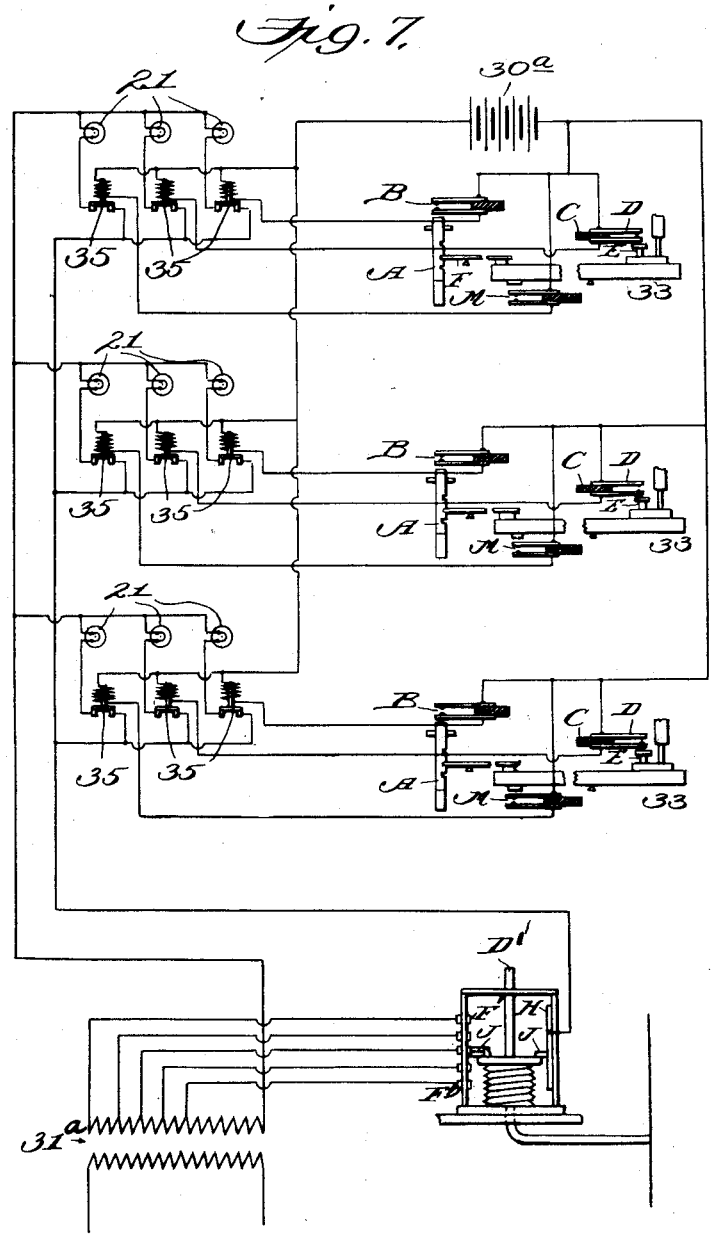

1,432,553

UNITED STATES PATENT OFFICE.

ALEXANDER BURNETT HECTOR, OF GREENWICH, NEAR SYDNEY, NEW SOUTH WALES, AUSTRALIA.

PRODUCTION OF COLOR MUSIC AND OTHER LUMINOUS EFFECTS AND APPARATUS THEREFOR.

Application filed June 8, 1917, Serial No. 173,671. Renewed July 11, 1922. Serial No. 574,283.

*To all whom it may concern:*

Be it known that I, ALEXANDER BURNETT HECTOR, a subject of the King of Great Britain, residing at Greenwich, near Sydney, in the State of New South Wales, Commonwealth of Australia, have invented certain new and useful Improvements in the Production of Color Music and Other Luminous Effects and Apparatus Therefor, of which the following is a specification.

This invention relates to improvements in the production of color music and other luminous spectacular effects and apparatus therefor, the colors having mathematical relation to the musical notes produced and forming a color harmony in mathematical relation to the musical harmony produced as described in my prior British Patent No. 29615 of 1912.

The present invention consists firstly in the arrangement of a color scale of treble and bass notes, secondly, in the apparatus whereby the mechanism of piano players, organs, or other keyed wind instruments may be conveniently utilized to obtain the desired effects in conjunction with such arrangement, and thirdly, in the means for the reflection and diffusion of light and production of shadows.

It is well known that when a double rainbow is seen, the colors of each bow follow a definite sequence thus: Upper rainbow—from outer to inner edges=violet to red; lower rainbow—from outer to inner edges=
35 red to violet, and that the various colors occupy a definite ration in space of the whole.

Advantage of this is taken by me to construct what I term a "color scale" of treble and bass notes in accordance with either of the tables as follows:—

Table A.

Treble notes.

7th octave.

| | |
|---|---|
| 3 light | violet. |
| 6 " | blue violet. |
| 4 " | blues. |
| 2 " | cyan blue. |
| 1 " | blue green. |
| 4 " | greens. |
| 5 " | greenish yellow and yellowish green. |
| 1 " | yellow. |
| 1 " | orange yellow. |
| 2 " | orange. |
| 5 " | red orange. |
| 15 " | red. |
| 15 dark | red. |
| 5 " | orange red. |
| 2 " | orange. |
| 1 " | yellow. |
| 5 " | greenish yellow and yellowish green. |
| 4 " | greens. |
| 1 " | blue green. |
| 2 " | cyan blue. |
| 4 " | blue. |
| 6 " | blue violet. |
| 3 " | violet. |

Middle octave. Middle "C"

1st octave.

Bass notes.

Table B.

Treble notes.

7th octave.

12 white or light fluorescent tints.

Light violet ⎫
to           ⎬ Spaced in same ratio as Table A.
light red.   ⎭

Middle octave. Middle "C"

Dark red     ⎫
to           ⎬ Spaced in same ratio as Table A.
dark violet. ⎭

1st octave.

Blackness.

(No lamps attached.)

Bass notes.

In the accompanying drawings,
Figure 1 is a side elevation partly in section of a switch of a piano player and its switch contacts according to my invention and adapted to be utilized in connection with my color scale.

Figure 2 is a side elevation of an auxiliary bellows, its connection with the main bellows and the contacts for obtaining variations in the intensity of the light in sympathy with the variations in sound intensity.

Figure 3 is a plan view illustrating an alternative apparatus for operating a rotary type of regulating switch to obtain the same result.

Figure 4 is a diagrammatic view illustrating, in a simplified form, the general principles of the complete system.

Figure 5 is a general perspective view of an apparatus for a normal instrument of seven octaves provided with one bank or unit of lights, showing how it may be operated on by a piano or organ, either alternately or simultaneously.

Figure 6 is a diagrammatic view illustrating one unit of the portion of the system for varying the intensity of the light.

Fig. 7 is a diagrammatic view of so much of the complete system as is required for co-operation with three keys of the musical instrument.

In Figure 4 is illustrated diagrammatically a system comprising a source of electric energy 30 and a circuit leading therefrom, said circuit including voltage varying means 31 and a series of differently colored lamps 21 connected in parallel and controlled respectively by circuit closers 32 operated by the keys 33 of the piano, organ, or other instrument. The voltage varying means 31 is, as hereinafter more fully explained, operated by the means for varying the volume of sound produced by the instrument. The lamps 21, in their relationship to the keys 33, are arranged in accordance with the color scale above set forth in Table A or Table B. It will be understood that in Figure 4 only a selected few of the keys 33, distributed throughout the scale, and their connected lamps 21, are shown, the remaining keys and lamps being omitted in order to simplify the illustration.

In Figure 1, A is part of a piano player action actuated usually by a player pneumatic and F a finger operated thereby. B is a series of electric spring contacts above, and M a switch placed under each key 33. G is an ebonite or other insulating piece, D spring contacts and E a switch at the rear of the piano.

In the "cabinet" piano player, when the mechanical finger F of the player delivers the blow to the key 33 of the piano, the part A operating the end of finger F moves upwards to a slight extent. By arranging a series of electric contacts B in parallel, each upward movement of the part A closes an individual contact and this in turn operates an individual electric lamp or series of lamps; when a piece of music is played on the mechanical player electrical contact is made for every note struck and the corresponding lamp is illuminated simultaneously, these lamps, being suitably coloured to produce the effect known as "color music." Each individual switch is suitably wired with insulated wire and brought to a common distributing board placed at the end of the "cabinet" player or other suitable position. It is also proposed to use the similar pneumatic movements of the "combined" piano player which operates the hammer of the piano so that when an individual note is struck an individual electric light is produced. Suitable modifications of the frame work of the "combined" player are made to provide for this added arrangement of switches.

In my British specification No. 29615 of 1912 I indicate how the downward movement of the piano or organ key can be utilized to close a switch M under each key, and I now wish to provide for the upward movement of the back of the key. The attached drawings will show this graphically. It will be seen that a piece of ebonite or wood G, the whole length of the piano, is supported on suitable supports. On each side are fixed a pair of spring contacts D, the number of pairs corresponding with the number of keys; on the back of each key a striker E is fixed in such a manner that when an individual key is depressed the striker causes the brass strips to make electrical contact and illuminate a lamp. It is thus possible to have three sets of lamps brought into glow simultaneously, that is, one from the "cabinet" piano player, one underneath the key of the piano and one at the back of the piano operated by the upward movement, so that by arranging the lamps of different candle power three different degrees of illumination are obtained.

Another special improvement is the arrangement illustrated in Figure 2 and which has for its object to vary the intensity of the light so that it will be in strict sympathy with the variations of the intensity of the sound produced.

To produce this result a small secondary bellows 18 is connected with the bellows $A^1$ of the "cabinet" player by a tube $C^1$. On the top of the secondary bellows $B^1$ is fixed a guide rod $D^1$ passing through the guide block $E^1$. On one side of the bellows a series of contacts $F^1$ are fixed to an insulating support $G^1$ and on the other side a contact strip H is similarly supported.

As the secondary bellows become inflated or deflated electrical connection is made between the strip H and one of the contacts F¹ through the sliding contacts J—J which are electrically connected. The respective contacts F' may be arranged in circuit with the circuit closers B, M and D (Fig. 1) of the several keys so that when the contacts J, J are in one position, operation of the keys will cause circuits to be closed through the several circuit closers B; when the contacts J, J are in another position the circuits will be closed through the circuit closers M and so on, whereby, if the circuit closers B, M and D control circuits to lamps of different candle powers, movements of the contacts J, J will serve to control the intensity of the light. Thus, as shown in Figure 6, each of the circuit closers B, D and M is connected in series with one of the contacts F' and with a lamp 21, the several lamps 21 being of the same color but of different candle powers. In this figure the connections for one key only are shown, but it will be understood that the circuit closers B of all of the keys will control the supply of current to the respective lamps through one contact F', all of the circuit closers D will control the supply of current to the respective lamps through another contact F' and that all of the circuit closers M will control the supply of current to the respective lamps through a third contact F'.

The same result may be accomplished with a single circuit closer and a single lamp for each key by the use of suitable voltage varying means, as indicated diagrammatically in Figure 4, in which case the contacts F' may be connected with the terminals of a rheostat 31 or voltage varying device.

The latter arrangement is illustrated more fully in Figure 7, wherein voltage varying means 31ª controls the voltage of current supplied to all of the lamps 21 simultaneously, and the circuits to all of the lamps corresponding to any one key 33 are closed at once by relays or electromagnetic switches 35 which latter are controlled respectively by the circuit closers B, D and M operated by such key.

The voltage varying means may be of any well known character, variable resistance being indicated in Figure 4. Alternatively the voltage may be varied through the agency of cells which are switched in or out by the action of the bellows; or in the case of alternating currents tappings from a regulating compensator may be connected to the studs F¹ as shown at 31ª in Fig. 7. For manipulating larger currents relays or electromagnetic switches, similar to the switches 35 shown in Fig. 7, may be used. Such electrical devices being well known in the art are not shown in detail herein. The number of steps for voltage regulation is not limited, the precise number depending upon the requirements or the particular type of apparatus used. Thus, in the arrangement shown in Fig. 6, three contacts F', corresponding respectively to the circuit closers B, D and M are employed. In Figs. 2 and 7 five contacts F', providing for five variations of voltage, are shown. It will be clear that in the systems shown in Figs. 4 and 7 any desired number of variations might be provided for.

In the simplified forms of apparatus illustrated in Figs. 4 and 6, the main light circuits are directly controlled by the circuit closers 32 or B, D, and M operated by the instrument keys 33. Preferably however, and as shown in Fig. 7, the key operated switches control auxiliary circuits from a suitable source of current 30ª to the relays or electromagnetic switches 35 which in turn control the main light circuits.

An alternative arrangement of voltage varying device is shown in Figure 3, the auxiliary bellows 17 being connected to the main bellows by the pipe C². The regulating switch D² is operated by the bellows 17 through a lever or system of levers E². By these means the secondary bellows of a piano player is made to operate a rotary type switch in order to obtain the same result.

The lamps 21 may be provided with differently colored globes or, preferably, may be enclosed by polished parabolic reflectors in front of which are placed colored screens of varying hues; the screens being made of glass, gelatine or other suitable material. To produce efficient diffusion of the colors, the lamps are made to project on to a dull white surface. To break up the light and to produce pleasing shadows, palms, flowers, rocks, and figures are interposed between the lamps and the white surface. Alternately the lamps may be made to project their coloured lights on suitable semi-opaque glass structures, such as a gothic church window or the like. The light may be transmitted through semi-opaque glass or the glass may be silvered and the light reflected.

A suitable arrangement is shown in Figure 5, wherein 10 is a player piano and 11 an organ having their respective regulating switches 12 and 13, the former being hand operated and the latter knee operated. 14 is a transformer, 15 a double throw switch and 16 a relay cabinet (and in which any relay may be operated by current from the battery to bring in a current of high voltage to a particular lamp) through which pass all electrical connections between the keys of either musical instrument 10 or 11 and the lamps 21 through a suitable connecting cable 16ª. 17 is a bellows controlled switch like that shown in Fig. 3 attached to the player piano, whereby the intensity of the current may be automatically controlled. 18 is a bellows controlled switch like that shown in Fig. 2 and attached to the organ for the same purpose. 19 is a screen in front of which is positioned any suitable object or objects as 20 to be illuminated. The lamps 21 are shown as consisting of seven rows corresponding to seven octaves increasing in geometric proportion as regards sizes of the lamps, reflectors and distances from the screen. These rows of lamps are divided up into their various colors as exemplified in Table A.

Having thus described my invention what I claim as new and desire to protect by Letters Patent, is:—

1. An apparatus of the character described comprising a key-operated musical instrument and a series of color displaying devices controlled respectively by the several keys of said instrument, the order of the colors displayed by said devices being, with respect to the note scale of said keys, such as to correspond to the arrangement of colors in the double rainbow, the violets being at the ends of the scale and the reds in the middle, and the colors displayed by the devices controlled by the bass notes being of darker hues than those corresponding to the treble notes.

2. An apparatus of the character described comprising a musical instrument provided with means for varying the intensity of sound produced thereby, a series of devices controlled by said instrument for displaying lights of different colors in accordance with the notes sounded by said instrument, and means pneumatically controlled by said intensity varying means of said instrument for varying the intensity of the light displayed by said devices.

3. An apparatus of the character described comprising a key operated musical instrument, a plurality of electric lamps of different powers pertaining to and controlled by each of the keys of said instrument, and means for selectively closing the circuit to separate lamps of different powers to vary the intensity of the light produced.

4. A key-operated musical instrument comprising, in combination, a note-sounding key pivoted intermediate its ends, circuit closing devices operated respectively by the opposite ends of said key, a player having a mechanical finger for striking said key, and a third circuit closing device operatively connected with said finger.

5. An apparatus of the character described comprising a pneumatically controlled musical instrument, a series of electrically operated devices controlled by said instrument for displaying lights of different colors in accordance with the notes sounded by said instrument, and means for varying the intensity of the light displayed by said devices, said means including a series of contacts connected with said devices, a bellows connected with said instrument and controlled by pneumatic pressure, and a contact carried by said bellows and cooperating with said first named contacts.

In testimony whereof I have hereunto set my hand.

ALEXANDER BURNETT HECTOR.

Witnesses:
CHARLES E. GRAHAM,
HENRY W. CLARKE.